US009524307B2

(12) United States Patent
Arkhipov

(10) Patent No.: US 9,524,307 B2
(45) Date of Patent: Dec. 20, 2016

(54) ASYNCHRONOUS ERROR CHECKING IN STRUCTURED DOCUMENTS

(71) Applicant: Microsoft Corporation, Redmond, WA (US)

(72) Inventor: Mikhail Arkhipov, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 800 days.

(21) Appl. No.: 13/827,313

(22) Filed: Mar. 14, 2013

(65) Prior Publication Data

US 2014/0279938 A1    Sep. 18, 2014

(51) Int. Cl.
*G06F 17/30*    (2006.01)

(52) U.S. Cl.
CPC ... *G06F 17/30303* (2013.01); *G06F 17/30896* (2013.01)

(58) Field of Classification Search
None
See application file for complete search history.

(56) References Cited

U.S. PATENT DOCUMENTS

| 5,758,184 | A | * | 5/1998 | Lucovsky | G06F 9/546 710/6 |
| 7,017,073 | B2 | | 3/2006 | Nair et al. | |
| 2004/0006744 | A1 | * | 1/2004 | Jones | G06F 17/2229 715/237 |
| 2004/0015879 | A1 | | 1/2004 | Pauw et al. | |
| 2007/0192671 | A1 | * | 8/2007 | Rufener | G06Q 10/10 715/205 |
| 2012/0317542 | A1 | | 12/2012 | Cook et al. | |
| 2012/0324340 | A1 | | 12/2012 | Arkhipov | |
| 2014/0019424 | A1 | * | 1/2014 | Goh | G06F 17/3089 707/690 |

OTHER PUBLICATIONS

Sexton, Sean., ".NET Basics—Do Work in Background Thread to Keep GUI Responsive", Retrieved at <<http://stuff.seans.com/2009/05/21/net-basics-do-work-in-background-thread-to-keep-gui-responsive/>>, May 21, 2009, pp. 19.
Wenzel, Makarius., "Asynchronous Proof Processing with Isabelle/Scala and Isabelle/jEdit", Retrieved at <<http://www4.in.tum.de/~wenzelm/papers/async-isabelle-scala.pdf>>, In Proceedings of User Interfaces for Theorem Provers, Jul. 15, 2010, pp. 15.

(Continued)

*Primary Examiner* — Son T Hoang
(74) *Attorney, Agent, or Firm* — Ben Tabor; Micky Minhas

(57) ABSTRACT

Systems and methods perform asynchronous error checking on a structured document. In accordance with the systems/methods, a first thread, such as a main application thread of a document editor, parses the document to identify one or more new elements included therein and create copies of the one or more new elements. A second thread, such as a background thread, applies error checking to the copies of the one or more new elements to generate error results corresponding to the one or more new elements. The first thread the uses the error results to indicate errors in association with the one or more new elements.

20 Claims, 5 Drawing Sheets

(56) References Cited

OTHER PUBLICATIONS

"UIDocument Class Reference", Retrieved at <<http://developer.apple.com/library/ios/#documentation/uikit/reference/UIDocument_Class/UIDocument/UIDocument.html>>, Retrieved Date: Feb. 22, 2013, pp. 24.

"Navigating your XML Document", Retrieved at <<http://www.xmlblueprint.com/help/html/topic_115.htm>>, Retrieved Date: Feb. 22, 2013, pp. 3.

Arthorne, John., "How You've Changed! Responding to Resource Changes in the Eclipse Workspace", Retrieved at <<http://www.eclipse.org/articles/Article-Resource-deltas/resource-deltas.html>>, Aug. 23, 2002, pp. 8.

\* cited by examiner

ASYNCHRONOUS ERROR CHECKING IN STRUCTURED DOCUMENTS

BACKGROUND

Editors exist that enable users to create and modify structured documents. For example, HyperText Markup Language (HTML) editors, Cascading Style Sheet (CSS) editors and Extensible Markup Language (XML) editors exist that enable users to create and modify documents in which elements can be embedded within other elements, thereby forming a tree-like structure. Some of these editors provide a user with an option to "validate" or "check" a document for potential syntactic and/or semantic errors. Often, the aforementioned error checking process is performed while the user is typing and errors identified by the process are displayed directly in the document using visual indicators such as underlining or squiggles.

When a document is large, the process of syntactic and/or semantic error checking may take a long time. The error checking is typically implemented as a background process that is performed either as part of a main application thread that is used to manage the editor's user interface (UI) or in a separate background thread. In a case in which the error checking is performed as part of the main application thread, such error checking must be performed during idle times when the user has stopped changing the document. Such a "check on idle" approach can block the main application thread, thereby making the editor appear sluggish.

If the error checking is performed in a background thread that is separate from the main application thread, the background thread may end up checking a document that is out of date. This is because the user may make changes to the document subsequent to the time when the background thread was started. As a result, the background thread may identify errors for document elements that have already been deleted. Furthermore, the position of various elements and attributes within the document may change as the user implements edits on the main application thread. Consequently, it may be difficult for the background thread to track where to display a visual indicator corresponding to an element or attribute that has been identified as erroneous. In addition, many graphical systems only permit UI updates to be handled by the main application thread which presents additional difficulties when a background thread is used for error checking.

Regardless of whether error checking is performed on a main application thread or a separate background thread, checking the complete document in the background after every change is inefficient and wastes a lot of central processing unit (CPU) cycles.

SUMMARY

A method for performing error checking on a document, such as a structured document, is described herein. In accordance with the method, in a first thread of execution executing upon at least one of one or more processors, the document is parsed to identify one or more new elements included therein and copies of the one or more new elements are created. In a second thread of execution executing upon at least one of the one or more processors, error checking is applied to the copies of the one or more new elements to generate error results corresponding to the one or more new elements.

A further method for performing error checking on a document, such as a structured document, is described herein. In accordance with this method, the following steps are performed by a first thread executing on at least one of one or more processors: identifying one or more new elements in the document, assigning an identifier (ID) to each new element, and storing a copy of each new element in a first queue. The copy of each new element stored in the first queue includes the ID associated with the new element and at least one of text and structural information associated with the new element. In further accordance with this method, the following steps are performed by a second thread executing on at least one of the one or more processors: retrieving each copy of each new element from the first queue, applying error checking to each retrieved copy of each new element to detect errors associated therewith, and in response to detecting an error associated with a retrieved copy of a new element, generating an error checking result comprising at least the ID associated with the retrieved copy of the new element.

In an embodiment of the foregoing method, the second thread stores the error checking result in a second queue. In further accordance with such an embodiment, the first thread may retrieve one or more error checking results from the second queue, and, for each retrieved error checking result, determine whether an element currently exists within the document that has an ID that is the same as the ID associated with the retrieved error checking result and, in response to determining that an element currently exists within the document that has an ID that is the same as the ID associated with the retrieved error checking result, generate an indication that the element is in error. Generating an indication that the element is in error may comprise generating a visual indication that the element is in error.

In further accordance with such an embodiment, the first thread may store each new element that it identifies in the document in a data structure, such as a tree data structure, that stores a plurality of elements that currently exist in the document and an ID associated with each of the plurality of elements. The first thread may also determine whether an element currently exists within the document that has an ID that is the same as an ID associated with an error checking result retrieved from the second queue by determining whether an element is stored within the data structure that has an ID that is the same as the ID associated with the retrieved error checking result.

In still further accordance with such an embodiment, the first thread may store each new element that it identifies in the document in a data structure, such as a tree data structure, that stores a plurality of elements that currently exist in the document, an ID associated with each of the plurality of elements, and current position information associated with each of the plurality of elements. The first thread may also generate an indication that an element is in error by obtaining from the data structure current position information associated with the element and generating the indication based on the current position information associated with the element.

In another embodiment of the foregoing method, the second thread applies error checking to a copy of a new element retrieved from the first queue responsive to determining that an element currently exists within the document that has an ID that is the same as the ID associated with the retrieved copy of the new element.

In further accordance with such an embodiment, the first thread may store each new element that it identifies in the document in a data structure, such as a tree data structure, that stores a plurality of elements that currently exist in the document and an ID associated with each of the plurality of elements. The second thread may apply error checking to a copy of a new element retrieved from the first queue responsive to determining that an element is stored within the data structure that has an ID that is the same as the ID associated with the retrieved copy of the new element.

A system is also described herein. The system includes one or more processors and a storage medium that stores computer program logic that is executable by the one or more processors. The computer program logic includes a parser configured to be executed by a first thread of execution and an error checker configured to be executed by a second thread of execution. The parser is further configured to identify one or more new elements in a document, to assign an ID to each new element, and to store a copy of each new element in a first queue. The copy of each new element includes the ID associated with the new element and at least one of text and structural information associated with the new element. The error checker is further configured to retrieve each copy of each new element from the first queue, apply error checking to each retrieved copy of each new element to detect errors associated therewith, and in response to detecting an error associated with a retrieved copy of a new element, generate an error checking result comprising at least the ID associated with the retrieved copy of the new element.

In an embodiment of the foregoing system, the error checker is further configured to store the error checking result in a second queue. In further accordance with such an embodiment, the computer program logic may further comprise an error indicator that is configured to be executed by the first thread of execution. The error indicator may be further configured to retrieve one or more error checking results from the second queue and, for each retrieved error checking result, determine whether an element currently exists within the document that has an ID that is the same as the ID associated with the retrieved error checking result, and in response to determining that an element currently exists within the document that has an ID that is the same as the ID associated with the retrieved error checking result, generate an indication that the element is in error. Generating an indication that the element is in error may comprise generating a visual indication that the element is in error.

In further accordance with such an embodiment, the parser may be further configured to store each new element that is identified in the document in a data structure, such as a tree data structure, that stores a plurality of elements that currently exist in the document and an ID associated with each of the plurality of elements. The error indicator may be further configured to determine whether an element currently exists within the document that has an ID that is the same as an ID associated with an error checking result retrieved from the first queue by determining whether an element is stored within the data structure that has an ID that is the same as the ID associated with the retrieved error checking result.

In still further accordance with such an embodiment, the parser may be further configured to store each new element in a data structure, such as a tree data structure, that stores a plurality of elements that currently exist in the document, an ID associated with each of the plurality of elements, and current position information associated with each of the plurality of elements. The error indicator may be further configured to generate an indication that an element is in error by obtaining from the data structure current position information associated with the element and generating the indication based on the current position information associated with the element.

In another embodiment of the foregoing system, the error checker is configured to apply error checking to a copy of a new element retrieved from the first queue responsive to determining that an element currently exists within the document that has an ID that is the same as the ID associated with the retrieved copy of the new element.

In further accordance with such an embodiment, the parser may be further configured to store each new element in a data structure, such as a tree data structure, that stores a plurality of elements that currently exist in the document and an ID associated with each of the plurality of elements. The error checker may be configured to apply error checking to a copy of a new element retrieved from the first queue responsive to determining that an element is stored within the data structure has an ID that is the same as the ID associated with the retrieved copy of the new element.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the claimed subject matter is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles of the invention and to enable a person skilled in the relevant art(s) to make and use the invention.

Figure 1:
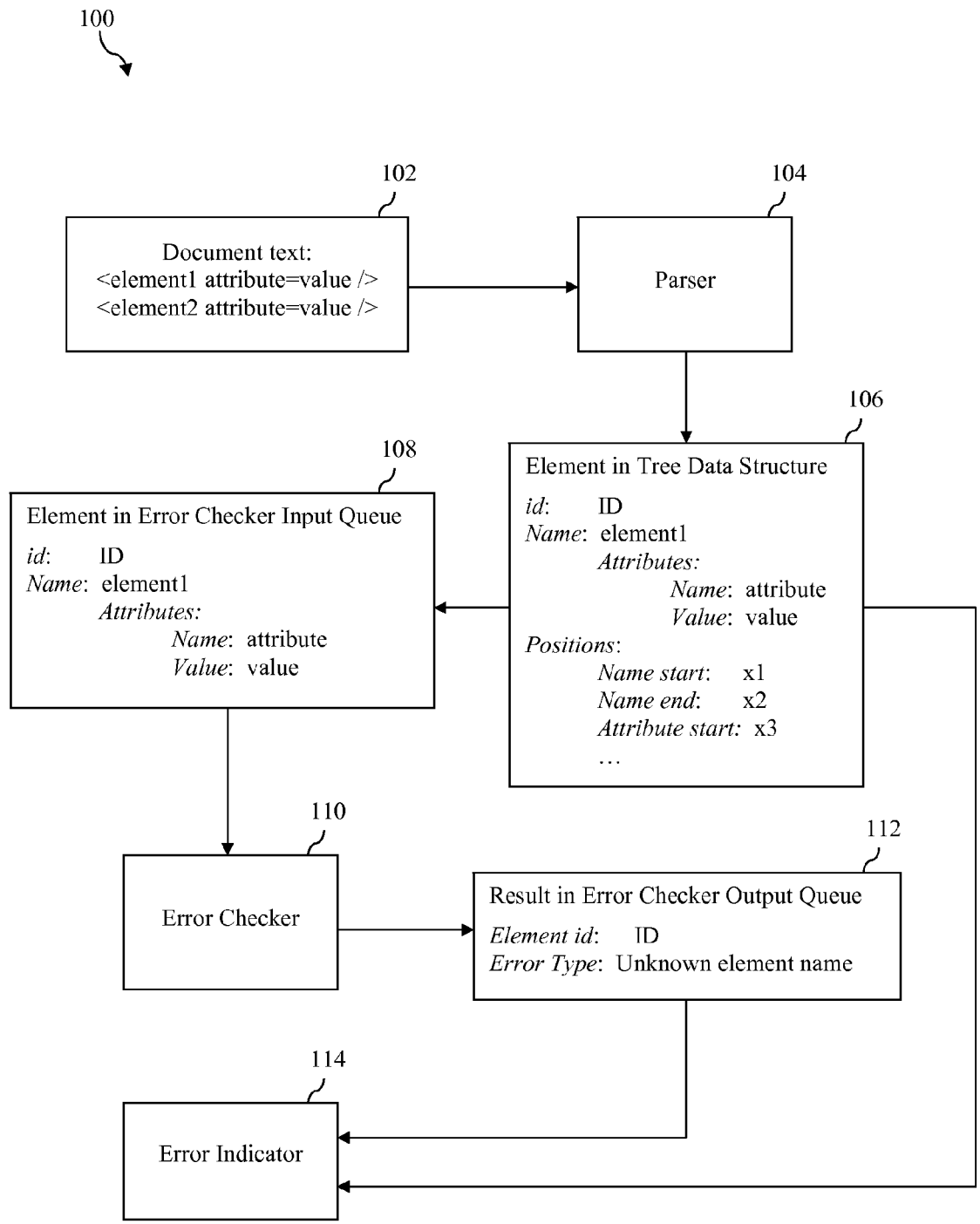
FIG. 1 is a block diagram of an example system that performs asynchronous error checking in structured documents in accordance with an embodiment.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of persons skilled in the relevant art(s) to implement such feature, structure, or characteristic in connection with other embodiments whether or not explicitly described.

As used herein, the term "structured document" is intended to broadly encompass any document that includes interrelated elements, wherein the relationships between elements are governed by a predefined set of rules. For example, HTML, CSS and XML are examples of languages that can be used to create documents in which elements are embedded within other elements, thereby forming a tree-like structure. As used herein, the term "an element of a document" broadly refers to a unit of information in a document that is less than all of the information in the document. What constitutes an element may vary from document type to document type and from implementation to implementation.

II. Example Systems and Methods for Performing Asynchronous Error Checking in Structured Documents FIG. 1 is a block diagram of an example system 100 that performs asynchronous error checking in structured documents in accordance with an embodiment. System 100 may comprise an integrated part of an editor or other application or service that enables users thereof to create and modify structured documents. For example, system 100 may comprise an integrated part of an HTML editor, a CSS editor, or an XML editor. Alternatively, system 100 may comprise a standalone application or service that can be used to apply syntactic and/or semantic checking to structured documents. Still other implementations are possible.

As shown in FIG. 1, system 100 includes a parser 104, an error checker 110, and an error indicator 114. Each of these elements may comprise a process or part of a process executing on one or more processors of a computer or other device. In one embodiment, parser 104 and error indicator 114 are executed on a first thread of execution ("thread") that is executed by at least one of the one or more processors and error checker 110 is executed on a second thread that is also executed by at least one of the one or more processors. For example, parser 104 and error indicator 114 may be executed on a main application thread of an application, such as an editor application, while error checker 110 may be executed on a background thread that is distinct from the main application thread. The first and second threads may be executed by the same processor or by different processors as will be appreciated by persons skilled in the relevant art(s).

Generally speaking, parser 104, error checker 110 and error indicator 114 operate together to enable syntactic and/or semantic checking to be applied to elements in a structured document to identify errors therein and to provide an indication of any identified errors to a user. The errors identified in this manner may comprise potential errors and/or actual errors. A description of how these components operate to provide this functionality will now be described with continued reference to FIG. 1.

Parser 104 operates to analyze the text of a document, such as document 102, to identify elements included therein. Parser 104 also operates to maintain a data structure that includes a representation of elements that currently exist in the document. As discussed in Section I above, a document element may comprise any unit of information in a document that is less than all of the information in the document. For example, an element may comprise a unit of information that has meaning within a particular markup language, style sheet language, programming language or the like. For example, in HTML, an element may be a hyperlink element such as:

<a href=www.microsoft.com>Click to get to Microsoft Web site!</a>

As another example, in CSS, an element may be a property name/property value pair such as "color: red".

In many types of structured documents, including but not limited to HTML, CSS and XML documents, elements can be nested, thereby creating a tree-like document structure. For example, in an HTML document, an element <a> may appear in a table cell element <td> that appears in a table row element <tr> that appears in a table element <table> that appears in a body element <body>, and so on. Such a structure may be represented as follows:

```
<body>
  <table>
    <tr>
      <td>
        <a></a>
      </td>
    </tr>
  </table>
</body>
```

In an embodiment, document 102 comprises a document having such a tree-like structure, and parser 104 operates to identify and maintain a representation of each element that currently exists within the document in a tree data structure. Such a tree data structure may advantageously be used to facilitate tracking of relationships between various elements in the document and to more efficiently manage parsing of the document as well as other document process tasks.

In an embodiment, parser 104 is configured to maintain at least the following information in association with each element stored within the tree data structure: an identifier (ID) of the element, text and/or structural information associated with the element, and current position information associated with the element. The current position information may indicate where in the document the element is located. The current position information may be represented, for example, as an offset from a document start in characters, as a line number and column number, or in some other manner.

FIG. 1 provides a particular example of information associated with an element 106 that is stored in a tree data structure by parser 104 in accordance with an embodiment. Element 106 corresponds to the text "<element 1 attribute=value />" in document 102. As shown in FIG. 1, parser 104 has assigned an id "ID" to element 106. As also shown in FIG. 1, parser 104 has identified the name of element 106 as "element 1", and has identified an attribute of element 106 having a name "attribute" and a value "value". Parser 104 also maintains current position information in association with element 106, including a current position for the start of the name of the element, the end of the name of the element, the start of the attributes of the element, and so on.

A user may make changes to document 102. For example, a user may interact with a user interface (UI) of an editor of which system 100 comprises a part to make changes to document 102. Such changes may include, for example, deleting, modifying or adding elements within document 102. Such changes may also include, for example, changing a current position of one or more elements within document 102 without changing the element(s) themselves. To account for such changes within the tree data structure, parser 104 operates to intermittently analyze document 102 to identify new elements and elements whose positions have changed. Parser 104 assigns a new ID to all new elements and ensures that such new elements are correctly represented within the tree data structure. Parser 104 also updates current position information associated with elements whose position has changed. A particularly efficient method that may be used to perform the aforementioned parsing process is described in commonly-owned, co-pending U.S. patent application Ser. No. 13/161,997 to Mikhail Arkhipov, filed Jun. 16, 2011 and entitled "Incrementally Tokenizing and/or Parsing a Style Sheet," the entirety of which is incorporated by reference herein. However, other techniques may be used as well.

To facilitate the error checking process, after each parsing pass, parser 104 passes a copy of any newly-identified elements to an error checker input queue. In certain implementations, parser 104 passes a copy of each newly-identified element and every child element thereof to the error checker input queue. Each copy of an element that is passed to the error checker input queue may include all of the information stored within the tree data structure in association with that element, or some subset of that information. For example, in one embodiment, each copy of an element that is passed to the error checker input queue may include only the ID associated with the element and the text and/or structural information associated with the element.

FIG. 1 provides a particular example of the information that may be included within a copy of a newly-identified element that is passed to the error checker input queue. As shown in FIG. 1, a copy of element 106 is generated and passed to the error checker input queue, where it is denoted element 108. Element 108 includes the same ID and name and attribute information as element 106 from which it was copied, but does not include the current position information included in element 106.

Error checker 110 operates to retrieve elements from the error checker input queue and apply syntactic and/or semantic checking to such elements. As noted above, error checker 110 may be executed on a second thread that is distinct from a first thread upon which parser 104 and error indicator 114 are executed. In accordance with such an embodiment, since error checker 110 can obtain a copy of the text and/or structural information associated with an element from the error checker input queue rather than from the tree data structure maintained by parser 104, error checker 110 can apply error checking to the element in the second thread without having to obtain such text and/or structural information from the tree data structure, thereby avoiding locks and thus improving performance.

In an embodiment, when error checker 110 retrieves an element from the error checker input queue, error checker 110 checks to determine if the retrieved element still exists in document 102. Error checker 110 may perform this function by determining whether an element having the same ID as the retrieved element is currently stored within the tree data structure. If error checker 110 determines that the retrieved element still exists in document 102, error checker 110 will apply syntactic and/or semantic error checking to the retrieved element. However, if error checker 110 determines that the retrieved element does not exist in document 102, then error checker 110 will not apply any error checking to the retrieved element. By performing this function, error checker 110 can avoid wasting system resources applying error checking an element that no longer exists because it was modified or deleted after a copy thereof was enqueued in the error checker input queue.

In a further embodiment, error checker 110 also maintains a list (or other data structure) that includes the IDs of elements that it has already checked. In accordance with such an embodiment, when error checker 110 retrieves an element from the error checker input queue, error checker 110 determines if the ID of the retrieved element is within the list of IDs of elements that have already been checked. If the ID of the retrieved element is not within the list of IDs of elements that have already been checked, then error checker 110 will apply syntactic and/or semantic error checking to the retrieved element. However, if the ID of the retrieved element is within the list of IDs of elements that have already been checked, then error checker 110 will not apply any error checking to the retrieved element. By performing this function, error checker 110 can avoid wasting system resources by repeatedly applying error checking to the same element. It is noted that this feature is optional, and in an alternate embodiment, error checker 110 applies error checking to any retrieved element that still exists within document 102.

After error checker 110 has applied syntactic and/or semantic error checking to an element retrieved from the error checker input queue, error checker 110 passes any results from the error checking to an error checker output queue. In one embodiment, error checker 110 only generates results if a potential or actual error is detected for a given element. Each result may include the ID of the element for which an error was detected, and information about the error that was detected. Such information may include, for example, one or more of an error type, an error code, an error message, or the like. FIG. 1 shows an example result 112 that is passed to the error checker output queue that includes the ID of the element for which the error was detected ("ID") and an error type of "Unknown element name".

Error indicator 114 operates to retrieve results from the error checker output queue. For each retrieved result, error indicator 114 determines whether an element associated with the result still exists within document 102. Error indicator 114 may perform this function by determining whether an element having the same ID as the retrieved result is currently stored within the tree data structure. If error indicator 114 determines that the element associated with the retrieved result still exists in document 102, error indicator 114 will generate an indication of the error. However, if error indicator 114 determines that the element associated with the retrieved result does not exist in document 102, then error indicator 114 will not generate an indication of the error.

In an embodiment, error indicator 114 generates an indication of an error associated with an element by generating a visual indication of the error in a UI that is used to display all or a portion of document 102. For example, error indicator 114 may underline or otherwise highlight an element within the UI for which an error result was generated.

To determine the current location of the relevant element within document 102 for the purpose of generating a visual indicator, error indicator 114 may obtain current location information associated with the relevant element from the tree data structure. Although visual indicators have been described, persons skilled in the relevant art(s) will readily appreciate that other types of indicators (e.g., audio indicators) may be used to indicate an error.

As noted above, error indicator 114 may be executed along with parser 104 by a first thread that is distinct from a second thread on which error checker 110 is executing. In one embodiment, error indicator 114 retrieves results from the error checker output queue and generates visual indicators corresponding thereto when the first thread has available cycles (e.g., when a main application executing on the first thread is idle).

The approach to error checking described above in reference to system 100 of FIG. 1 enables the error checking function to be performed on a background thread that is different from a main application thread that may be used to manage a UI of a document editor. Since error checking is applied in the background thread, the main application thread need not perform such error checking during idle times when a user has stopped changing the document. As noted in the Background Section, above, such a "check on idle" approach can block the main application thread, making the document editor appear sluggish.

The approach to error checking described above in reference to system 100 of FIG. 1 also renders the error checking process more efficient, since the approach only applies error checking to new elements as they are created within the document, rather than to the entire document.

Furthermore, the approach to error checking described above in reference to system 100 avoids the issue of the background thread checking a document that is out of date. This is because the background thread does not apply error checking to an element of a document unless the element is determined to still exist at the time a copy thereof is retrieved from the error checker input queue. The approach also addresses the issue of document elements that move while checking is occurring is in the background by maintaining valid current position information in the tree document that can be retrieved by the error indicator when it is ready to generate a visual indication of an error.

Figure 2:
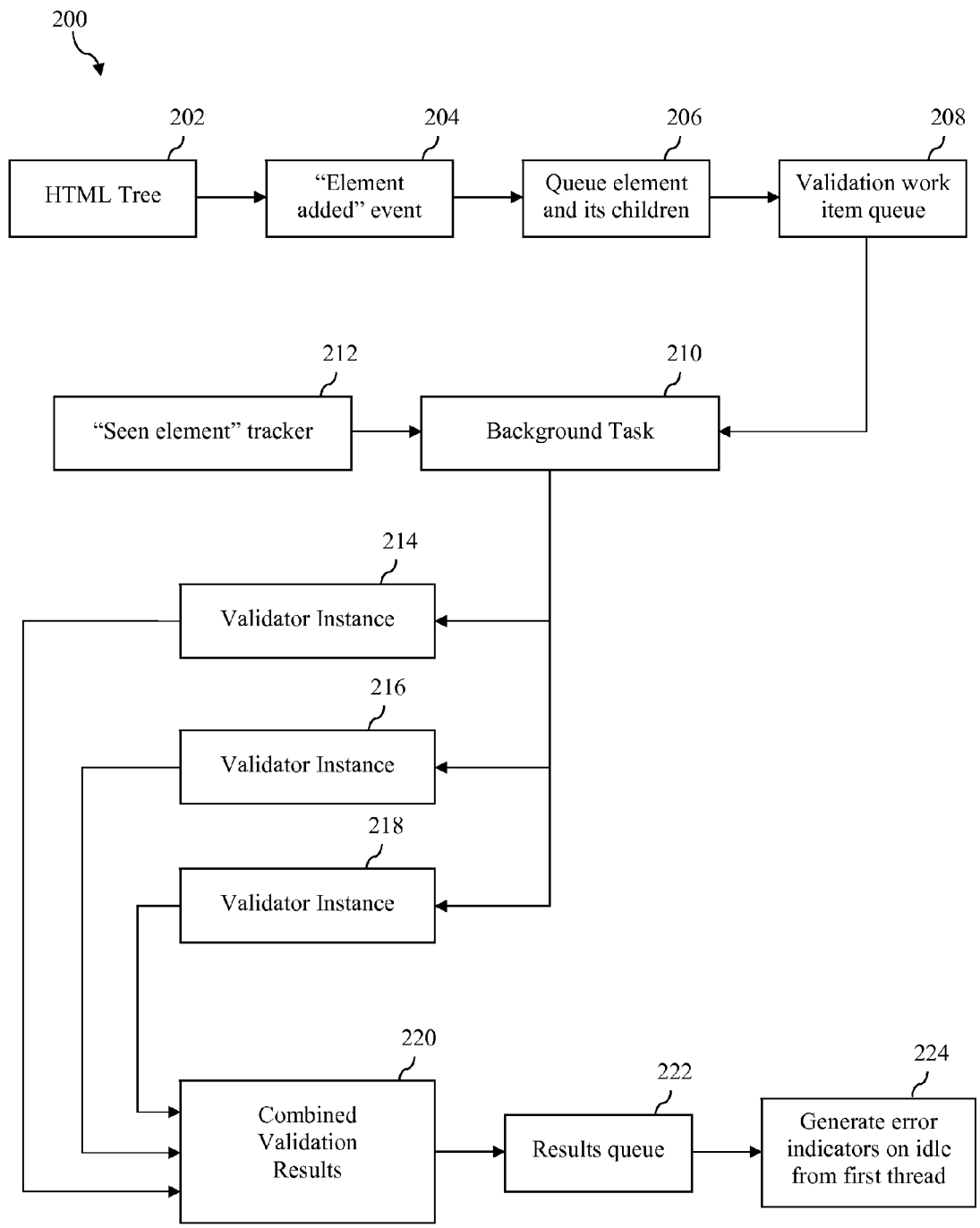
FIG. 2 is a block diagram that illustrates the application of asynchronous error checking to an HTML document in accordance with a particular embodiment.

To help further illustrate how the asynchronous error checking process may be implemented, FIG. 2 depicts a block diagram 200 that illustrates the application of asynchronous error checking to an HTML document. Although block diagram 200 illustrates the application of asynchronous error checking to an HTML document, persons skilled in the relevant art(s) will appreciate that similar techniques may be applied to other types of structured documents, including but not limited to CSS documents, XML documents, or the like.

As shown in FIG. 2, an HTML tree 202 is maintained by a first thread, such as a main application thread associated with an HTML editor. HTML tree 202 stores elements of an HTML document in a hierarchical tree-like structure. When a new element is added to HTML tree 202, an "element added" event 204 is triggered. In response to the triggering of "element added" event 204, the first thread stores a copy of the new element as well as a copy of any child elements of the new element 206 in a validation work item queue 208. Each copy of an element passed to validation work item queue 208 includes the same ID as the element in HTML tree 202 from which it was obtained. Each copy of an element passed to validation work item queue 208 also includes text and/or structural information associated with the element.

As further shown in FIG. 2, a background task 210 executing in a second thread (e.g., a background thread) obtains elements from validation work item queue 208. A "seen element" tracker 212 also executing in the second thread maintains a list of IDs of elements that have already been validated. Background task 210 interacts with "seen element tracker" 212 to determine if an element retrieved from validation work item queue 208 has already been validated. Background task 210 may perform this function by comparing the ID of an element retrieved from validation work item queue 208 to the list of IDs maintained by "seen element" tracker 212. If the ID of the element retrieved from validation work item queue 208 is in the list of IDs maintained by "seen element" tracker 212, then background task 210 will not allow the element to be validated again. However, if the ID of the element retrieved from validation work item queue 208 is not in the list of IDs maintained by "seen element" tracker 212, then background task 210 may cause the element to be validated. It is noted that this functionality is optional and, in an alternate implementation, "seen element" tracker 212 is not utilized.

Background task 210 also operates to determine whether an element retrieved from validation work item queue 208 still exists within HTML tree 202. Background task 210 may perform this operation by determining whether an element exists in HTML tree 202 that has the same ID as the element that was retrieved from validation work item queue 208. If it turns out that the element retrieved from validation work item queue 208 does not still exist within HTML tree 202, then background task 210 will not allow the element to be validated. However, if it turns out that the element retrieved from validation work item queue 208 still exists within HTML tree 202, then background task 210 may cause the element to be validated.

Once background task 210 has determined that an element retrieved from validation work item queue 208 is to be validated, background task 210 passes the element to one of a plurality of concurrently-executing validator instances, denoted validator instance 214, validator instance 216 and validator instance 218. Each of these validator instances is capable of applying syntactic and/or semantic error checking to an element and generating results in a case where an error is found. The use of multiple validator instances as shown in FIG. 2 enables different elements to be error checked in parallel, thereby increasing error checking throughput. Each validator instance may be executed on the same thread as background task 210. Alternatively, each validator instance may be executed on its own thread. Background task 210 may determine which validator instance to pass an element to based on an ordering algorithm (such as a round-robin algorithm) or an algorithm that attempts to balance the current load on each validator instance. Although three validator instances are shown in FIG. 2, it is to be understood that any number of validator instances may be used depending upon the implementation.

Results generated by validator instances 214, 216 and 218 are combined 220 and passed to a results queue 222. Each result may include the ID of an element for which the result was generated and information about a potential or actual error associated with the element. Such error information may include, for example, an error code, error message, error type, or the like.

During idle periods, the first thread obtains results from results queue 222 and generates error indicators in association with the elements referenced by the results. An error indicator may comprise, for example, a visual indicator that is displayed in a UI of the HTML editor in association with an element. Current position information for generating the visual indicator for the element can be obtained from HTML tree 202. Other types of indicators other than visual indicators (e.g. audio indicators) may be used to identify elements in error as well.

Figure 3:
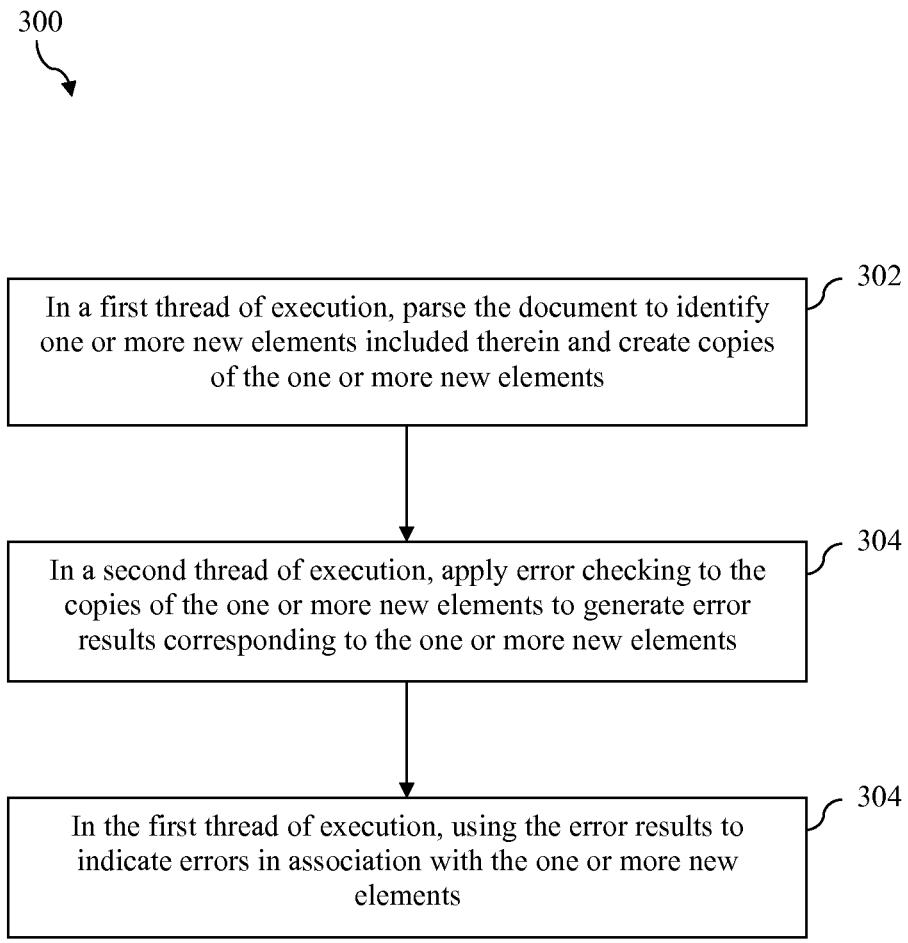
FIG. 3 depicts a flowchart of a first method for performing asynchronous error checking on a structured document in accordance with an embodiment.

Various methods will now be described for performing asynchronous error checking on a structured document. For example, FIG. 3 depicts a flowchart 300 of a first method for performing asynchronous error checking on a structured document in accordance with an embodiment. The method of flowchart 300 may be performed by any device that includes one or more processors and that supports multi-threaded execution.

As shown in FIG. 3, the method of flowchart 300 begins at step 302, in which, in a first thread of execution executed by at least one of the one or more processors, the document is parsed to identify one or more new elements included therein and copies of the one or more new elements are created. The document may comprise, for example, a structured document, such as an HTML, CSS or XML document. This step may be performed, for example, by a main application thread of a document editor, although the method is not so limited.

At step 304, in a second thread of execution executed by at least one of the one or more processors, error checking is applied to the copies of the one or more new elements to generate error results corresponding to the one or more new elements. This step may be performed, for example, by a background thread that is distinct from the main application thread, although the method is not so limited.

At step 306, in the first thread of execution, the error results generated during step 304 are used to indicate errors in association with the one or more new elements. In an embodiment, the error results are used to visually indicate errors in association with the one or more new elements in a UI of a document editor, although the method is not so limited.

Figure 4:
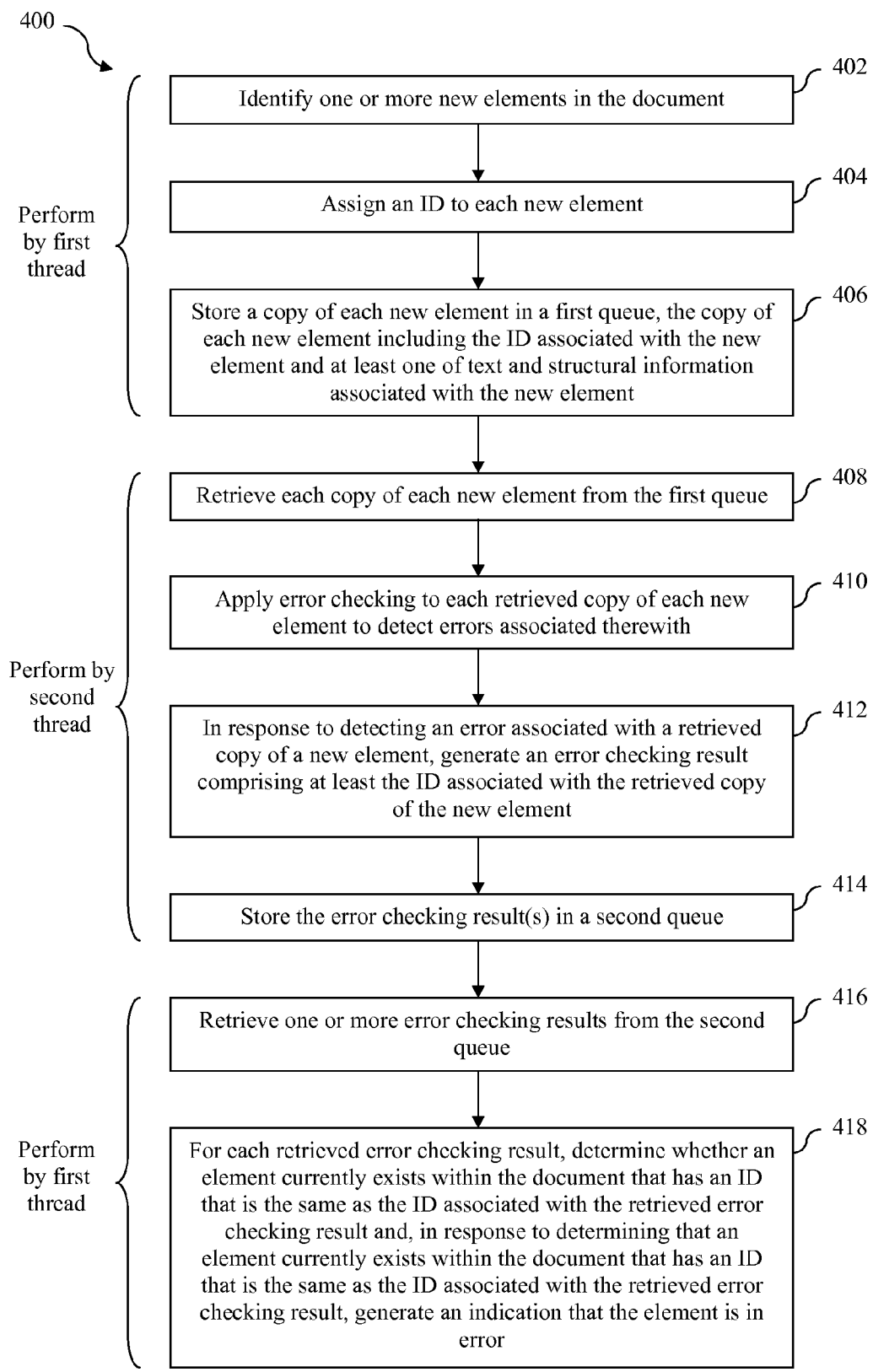
FIG. 4 depicts a flowchart of a second method for performing asynchronous error checking on a structured document in accordance with an embodiment.

FIG. 4 depicts a flowchart of a second method for performing asynchronous error checking on a structured document in accordance with an embodiment. Like the method of flowchart 300, the method of flowchart 400 may be performed by any device that includes one or more processors and is capable of performing multi-threaded execution.

As shown in FIG. 4, the method of flowchart 400 includes a number of steps that are performed by a first thread of execution executing upon at least one of the one or more processors and a number of steps that are performed by a second thread of execution executing upon at least one of the one or more processors. In particular, steps 402, 404, 406, 416 and 418 are performed by the first thread, while steps 410, 412 and 414 are performed by the second thread.

The method of flowchart 400 begins at step 402, in which the first thread identifies one or more new elements in the document. The document may comprise, for example, a structured document, such as an HTML, CSS or XML document.

At step 404, the first thread assigns an ID to each new element. In an embodiment, the first thread also stores each new element in a data structure, such as a tree data structure, that stores a plurality of elements that currently exist in the document and an ID associated with each of the plurality of elements. The data structure may also store current position information associated with each of the plurality of elements.

At step 406, the first thread stores a copy of each new element in a first queue.

The copy of each new element includes at least the ID associated with the new element and at least one of text and structural information associated with the new element.

At step 408, the second thread retrieves each copy of each new element from the first queue.

At step 410, the second thread applies error checking to each retrieved copy of each new element to detect errors associated therewith. The second thread may apply error checking to a retrieved copy of a new element only in response to determining that an element currently exists within the document that has an ID that is the same as the ID associated with the retrieved copy of the new element. As noted above, in an embodiment, the first thread stores each new element in a data structure, such as a tree data structure, that stores a plurality of elements that currently exist in the document and an ID associated with each of the plurality of elements. In accordance with such an embodiment, the second thread may apply error checking to a retrieved copy of a new element only in response to determining that an element is stored within the data structure that has an ID that is the same as the ID associated with the retrieved copy of the new element.

At step 412, in response to detecting an error associated with a retrieved copy of a new element, the second thread generates an error checking result comprising at least the ID associated with the retrieved copy of the new element. The error checking results may also include other information, such as an error code, error message, error type, or the like.

At step 414, the second thread stores any error checking result(s) in a second queue.

At step 416, the first thread retrieves one or more error checking results from the second queue.

At step 418, for each retrieved error checking result, the first thread determines whether an element currently exists within the document that has an ID that is the same as the ID associated with the retrieved error checking result and, in response to determining that an element currently exists within the document that has an ID that is the same as the ID associated with the retrieved error checking result, the first thread generates an indication that the element is in error. The first thread may generate a visual indication that the element is in error, or some other type of indication.

As noted above, in an embodiment, the first thread stores each new element in a data structure, such as a tree data structure, that stores a plurality of elements that currently exist in the document and an ID associated with each of the plurality of elements. In accordance with such an embodiment, during step 418, the first thread may determine whether an element currently exists within the document that has an ID that is the same as the ID associated with the retrieved error checking result by determining whether an element is stored within the data structure that has an ID that is the same as the ID associated with the retrieved error checking result.

As also noted above, in an embodiment, the first thread stores each new element in a data structure, such as a tree data structure, that stores a plurality of elements that currently exist in the document, an ID associated with each of the plurality of elements, and current position information associated with each of the plurality of elements. In accordance with such an embodiment, during step 418, the first thread may generate an indication that the element is in error by obtaining from the data structure current position information associated with the element and generating the indication based on the current position information associated with the element.

III. Example Processor-Based System Implementation

Figure 5:
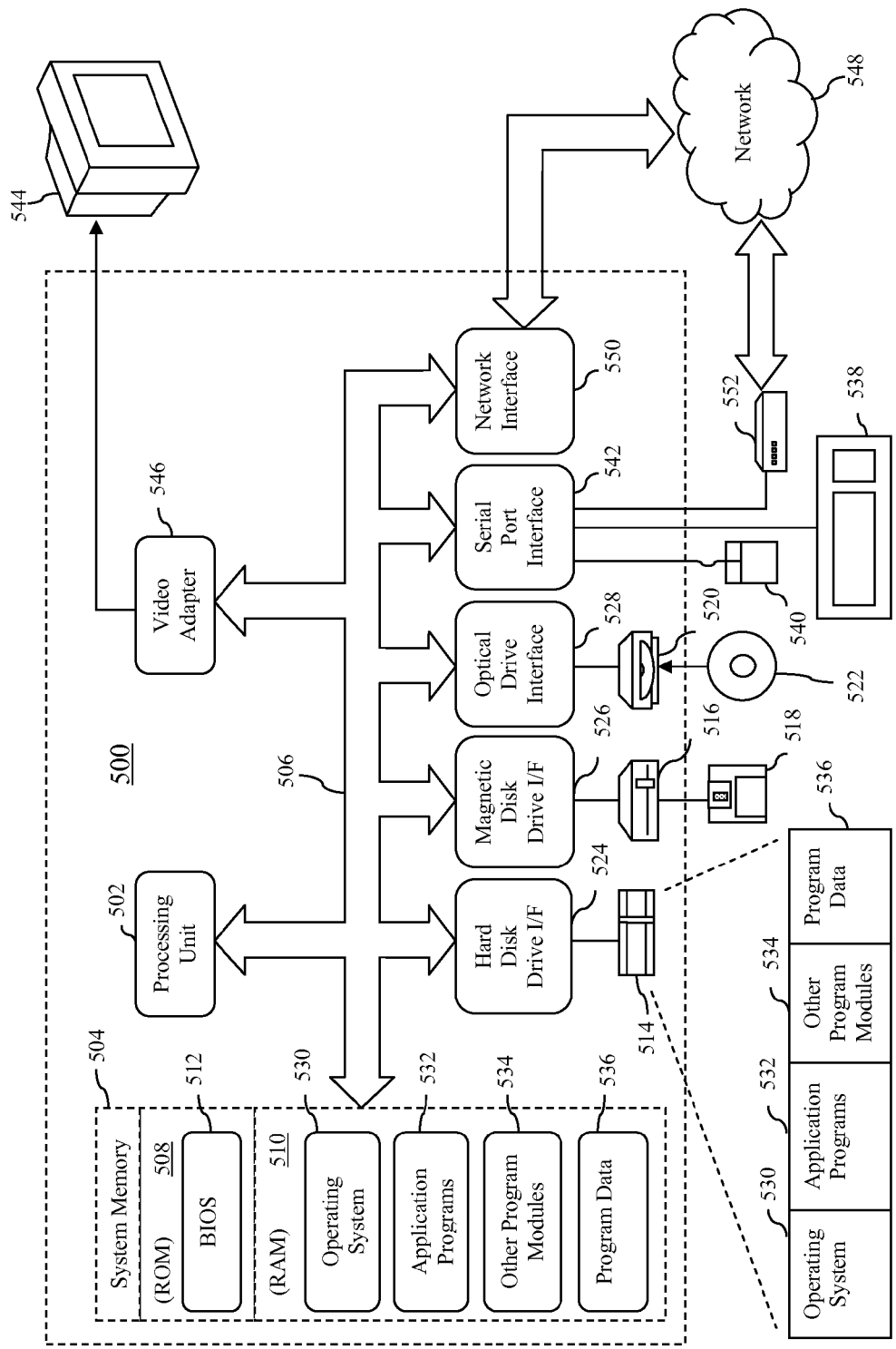
FIG. 5 is a block diagram of an example processor-based computer system that may be used to implement various embodiments.

FIG. 5 depicts an example processor-based computer system 500 that may be used to implement various embodiments described herein. For example, system 500 may be used to execute any of the components described above in reference to FIGS. 1 and 2 and any of the steps of the flowcharts described above in reference to FIGS. 3 and 4. The description of system 500 provided herein is provided for purposes of illustration, and is not intended to be limiting. Embodiments may be implemented in further types of computer systems, as would be known to persons skilled in the relevant art(s).

As shown in FIG. 5, system 500 includes a processing unit 502, a system memory 504, and a bus 506 that couples various system components including system memory 504 to processing unit 502. Processing unit 502 may comprise one or more processors or processing cores. Bus 506 represents one or more of any of several types of bus structures, including a memory bus or memory controller, a peripheral bus, an accelerated graphics port, and a processor or local bus using any of a variety of bus architectures. System memory 504 includes read only memory (ROM) 508 and random access memory (RAM) 510. A basic input/output system 512 (BIOS) is stored in ROM 508.

System 500 also has one or more of the following drives: a hard disk drive 514 for reading from and writing to a hard disk, a magnetic disk drive 516 for reading from or writing to a removable magnetic disk 518, and an optical disk drive 520 for reading from or writing to a removable optical disk 522 such as a CD ROM, DVD ROM, BLU-RAY™ disk or other optical media. Hard disk drive 514, magnetic disk drive 516, and optical disk drive 520 are connected to bus 506 by a hard disk drive interface 524, a magnetic disk drive interface 526, and an optical drive interface 528, respectively. The drives and their associated computer-readable media provide nonvolatile storage of computer-readable instructions, data structures, program modules and other data for the computer. Although a hard disk, a removable magnetic disk and a removable optical disk are described, other types of computer-readable storage devices and storage structures can be used to store data, such as flash memory cards, digital video disks, random access memories (RAMs), read only memories (ROM), and the like.

A number of program modules may be stored on the hard disk, magnetic disk, optical disk, ROM, or RAM. These program modules include an operating system 530, one or more application programs 532, other program modules 534, and program data 536. In accordance with various embodiments, the program modules may include computer program logic that is executable by processing unit 502 to perform any or all of the functions and features of the components described above in reference to FIG. 1 and FIG. 2. The program modules may also include computer program logic that, when executed by processing unit 502, performs any of the steps or operations shown or described in reference to the flowcharts of FIGS. 3 and 4.

A user may enter commands and information into system 500 through input devices such as a keyboard 538 and a pointing device 540. Other input devices (not shown) may include a microphone, joystick, game controller, scanner, or the like. In one embodiment, a touch screen is provided in conjunction with a display 544 to allow a user to provide user input via the application of a touch (as by a finger or stylus for example) to one or more points on the touch screen. These and other input devices may be connected to processing unit 502 through a serial port interface 542 that is coupled to bus 506, but may be connected by other interfaces, such as a parallel port, game port, or a universal serial bus (USB).

A display 544 is also connected to bus 506 via an interface, such as a video adapter 546. In addition to display 544, system 500 may include other peripheral output devices (not shown) such as speakers and printers.

System 500 is connected to a network 548 (e.g., a local area network or wide area network such as the Internet) through a network interface or adapter 550, a modem 552, or other suitable means for establishing communications over the network. Modem 552, which may be internal or external, is connected to bus 506 via serial port interface 542.

As used herein, the terms "computer program medium," "computer-readable medium," and "computer-readable storage medium" are used to generally refer to storage devices or storage structures such as the hard disk associated with hard disk drive 514, removable magnetic disk 518, removable optical disk 522, as well as other storage device or storage structures such as flash memory cards, digital video disks, random access memories (RAMs), read only memories (ROM), and the like. Such computer-readable storage media are distinguished from and non-overlapping with communication media (do not include communication media). Communication media typically embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media. Embodiments are also directed to such communication media.

As noted above, computer programs and modules (including application programs 532 and other program modules 534) may be stored on the hard disk, magnetic disk, optical disk, ROM, or RAM. Such computer programs may also be received via network interface 550, serial port interface 542, or any other interface type. Such computer programs, when executed or loaded by an application, enable system 500 to implement features of the embodiments discussed herein. Accordingly, such computer programs represent controllers of system 500.

Embodiments are also directed to computer program products comprising software stored on any computer useable medium. Such software, when executed in one or more data processing devices, causes a data processing device(s) to operate as described herein. Embodiments of the present invention employ any computer-useable or computer-readable medium, known now or in the future. Examples of computer-readable mediums include, but are not limited to storage devices and storage structures such as RAM, hard drives, floppy disks, CD ROMs, DVD ROMs, zip disks, tapes, magnetic storage devices, optical storage devices, MEMs, nanotechnology-based storage devices, and the like.

In alternative implementations, any of the components described in reference to FIGS. 1 and 2 and any of the operations described in reference to FIGS. 3 and 4 may be implemented using hardware logic/electrical circuitry or firmware. In accordance with further embodiments, one or more of these components or operations may be implemented in a system-on-chip (SoC). The SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

IV. Conclusion

While various embodiments have been described above, it should be understood that they have been presented by way of example only, and not limitation. It will be apparent to persons skilled in the relevant art(s) that various changes in form and details can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A method for performing error checking on a structured document, comprising:
    performing by a first thread executing on at least one of one or more processors that are capable of performing multi-threaded executions:
        identifying one or more new elements in the document;
        assigning an identifier (ID) to each new element; and
        storing a copy of each new element in a first queue, the copy of each new element including the ID associated with the new element and at least one of text and structural information associated with the new element; and
    performing by a second thread executing on the at least one of the one or more processors:
        retrieving each copy of each new element from the first queue;
        applying error checking to each retrieved copy of each new element to detect errors associated therewith; and
        in response to detecting an error associated with a retrieved copy of a respective new element, generating an error checking result comprising at least the ID associated with the retrieved copy of the respective new element.

2. The method of claim 1, wherein the generating the error checking result comprises:
    generating the error checking result comprising at least the ID associated with the retrieved copy of the respective new element and an error type.

3. The method of claim 1, further comprising performing by the second thread:
    storing the error checking result in a second queue.

4. The method of claim 3, further comprising performing by the first thread:
    retrieving one or more error checking results from the second queue; and
    for each retrieved error checking result:
        determining whether an element currently exists within the document that has an ID that is the same as the ID associated with the retrieved error checking result; and
        in response to determining that the element currently exists within the document that has the ID that is the same as the ID associated with the retrieved error checking result, generating an indication that the element is in error.

5. The method of claim 4, wherein the generating the indication that the element is in error comprises generating a visual indication that the element is in error.

6. The method of claim 4, further comprising performing by the first thread:
    storing each new element in a data structure that stores a plurality of elements that currently exist in the document and an ID associated with each of the plurality of elements; and
    wherein the determining whether the element currently exists within the document that has the ID that is the same as the ID associated with the retrieved error checking result comprises determining whether the element is stored within the data structure that has the ID that is the same as the ID associated with the retrieved error checking result.

7. The method of claim 6, wherein the storing each new element in the data structure comprises storing each new element in a tree data structure.

8. The method of claim 6, wherein the storing each new element in the data structure comprises storing each new element in the data structure that stores a plurality of elements that currently exist in the document, an ID associated with each of the plurality of elements, and
    current position information associated with each of the plurality of elements; and
    wherein the generating the indication that the element is in error comprises obtaining from the data structure current position information associated with the element and generating the indication based on the current position information associated with the element.

9. The method of claim 1, wherein the applying error checking to each retrieved copy of each new element comprises:
    applying the error checking to a retrieved copy of a new element responsive to determining that an element currently exists within the document that has an ID that is the same as the ID associated with the retrieved copy of the new element.

10. The method of claim 9, further comprising performing by the first thread:
    storing each new element in a data structure that stores a plurality of elements that currently exist in the document and an ID associated with each of the plurality of elements; and
    wherein the applying error checking to each retrieved copy of each new element comprises applying the error checking to a retrieved copy of a new element responsive to determining that the element is stored within the data structure that has the ID that is the same as the ID associated with the retrieved copy of the new element.

11. The method of claim 1, wherein the identifying the one or more new elements in the document comprises:
    identifying one or more new elements in a HyperText Markup Language (HTML) document, a Cascading Style Sheet (CSS) document, or an Extensible Markup Language (XML) document.

12. A system for performing error checking on a structured document, comprising:
    one or more processors that are capable of performing multi-threaded executions and are implemented at least partially by hardware; and a storage medium that stores computer program logic that is executable by the one or more processors, the computer program logic comprising:
  a parser configured to be executed by a first thread of execution on at least one of the one or more processors, the parser being further configured to:
    identify one or more new elements in the document, assign an identifier (ID) to each new element, and store a copy of each new element in a first queue, the copy of each new element including the ID associated with the new element and at least one of text and structural information associated with the new element; and
  an error checker configured to be executed by a second thread of execution on the at least one of the one or more processors, the error checker being further configured to:
    retrieve each copy of each new element from the first queue,
    apply error checking to each retrieved copy of each new element to detect errors associated therewith, and
    in response to detecting an error associated with a retrieved copy of a respective new element, generate an error checking result comprising at least the ID associated with the retrieved copy of the respective new element.

13. The system of claim 12, wherein the error checker is further configured to store the error checking result in a second queue.

14. The system of claim 13, wherein the computer program logic further comprises an error indicator configured to be executed by the first thread of execution, the error indicator being further configured to retrieve one or more error checking results from the second queue and, for each retrieved error checking result:
  determine whether an element currently exists within the document that has an ID that is the same as the ID associated with the retrieved error checking result, and
  in response to the determining that the element currently exists within the document that has the ID that is the same as the ID associated with retrieved error checking result, generate an indication that the element is m error.

15. The system of claim 14, wherein the parser is further configured to store each new element in a data structure that stores a plurality of elements that currently exist in the document and an ID associated with each of the plurality of elements, and wherein the error indicator is configured to determine whether the element currently exists within the document that has the ID that is the same as the ID associated with the retrieved error checking result by determining whether the element is stored within the data structure that has the ID that is the same as the ID associated with the retrieved error checking result.

16. The system of claim 14, wherein the parser is further configured to store each new element in a data structure that stores a plurality of elements that currently exist in the document, an ID associated with each of the plurality of elements, and current position information associated with each of the plurality of elements, and wherein the error indicator is configured to generate the indication that the element is in error by obtaining from the data structure current position information associated with the element and generating the indication based on the current position information associated with the element.

17. The system of claim 12, wherein the error checker is configured to apply error checking to a retrieved copy of a new element responsive to determining that an element currently exists within the document that has an ID that is the same as the ID associated with the retrieved copy of the new element.

18. The system of claim 17, wherein the parser is further configured to store each new element in a data structure that stores a plurality of elements that currently exist in the document and an ID associated with each of the plurality of elements; and
  wherein the error checker is configured to apply error checking to a retrieved copy of a new element responsive to determining that the element is stored within the data structure that has the ID that is the same as the ID associated with the retrieved copy of the new element.

19. The system of claim 12, wherein the parser is configured to identify the one or more new elements in a HyperText Markup Language (HTML) document, a Cascading Style Sheet (CSS) document, or an Extensible Markup Language (XML) document.

20. A method for performing error checking on a structured document, comprising:
  in a first thread of execution executing upon at least one of one or more processors that are capable of performing multi-threaded executions, parsing the document to identify one or more new elements included therein and creating copies of the one or more new elements;
  in a second thread of execution executing upon the at least one of the one or more processors,
    applying error checking to each of the copies of the one or more new elements to generate error results corresponding to the one or more new elements, and storing the generated error results in a queue; and
  in the first thread of execution, retrieving one or more of the error results from the queue, and for each retrieved error result:
    determining whether an element currently exists within the document that has an identifier (ID) that is the same as an ID associated with the retrieved error result; and
    in response to determining that the element currently exists within the document that has the ID that is the same as the ID associated with the retrieved error result, generating an indication that the element is in error.

* * * * *